May 23, 1939.  A. VANG  2,159,916

PROCESS FOR ELECTRIC FLASH PERCUSSIVE WELDING

Filed Dec. 1, 1937

INVENTOR.
Alfred Vang
BY
Barnes, Kisselle, Laughlin & Raisch
ATTORNEYS.

Patented May 23, 1939

2,159,916

UNITED STATES PATENT OFFICE 2,159,916

PROCESS FOR ELECTRIC FLASH PERCUSSIVE WELDING

Alfred Vang, Detroit, Mich., assignor to Vanco Products, Detroit, Mich., a corporation of Michigan Application December 1, 1937, Serial No. 177,445

8 Claims. (Cl. 219—10)

This invention relates to a process for electric flash percussive welding.

Electro-percussive welding is old, see the United States patent to Chubb, 1,066,468. The electro-percussive process of welding as heretofore practiced briefly consists of discharging a high capacity condenser through the points to be welded when the points are brought into physical contact with force considerable enough to create a forging effect.

It is the object of this invention to improve the heretofore known electro-percussive process of welding so that the process can be practiced with greater savings in the amount of current used and in the metals being welded.

It is also an object of this invention to produce a process for welding similar metals or metallic alloys as well as metals and metallic alloys having different melting points and of different hardness.

In the art as heretofore practiced the metals to be welded were brought together initially with a point contact and the voltages used were so low that the current did not flow between the metals to be welded until the points were brought into physical contact. The instant invention departs from the practice of the prior art in that the current used is of sufficiently high voltage so that it has the ability to jump a gap between the metals being welded before the same are brought together so that the surfaces of these metals are molten before the actual physical contact takes place. Further, the surfaces to be welded are preferably flat or such that a surface to surface contact is made between the metals to be welded.

Figure 1:
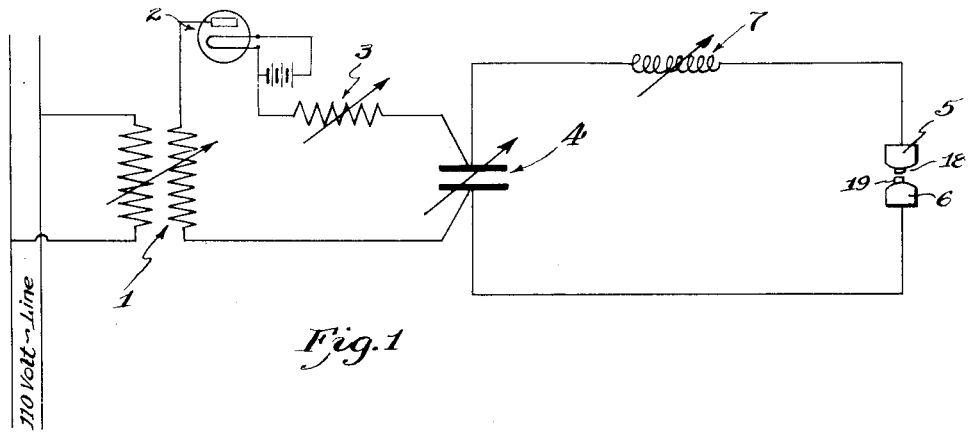
Fig. 1 is a diagrammatic showing of the welding circuit.

Referring more particularly to the drawing it will be seen that the welding current is drawn from an ordinary 110 volt line. The 110 volt current is passed through the transformer 1 which raises the voltage. The amount that the voltage will be stepped up by the transformer 1 will depend upon several variable factors such as the kind of metals to be welded and the area of the surfaces which are to be welded together, but in any event the voltage must be sufficiently high so that it will jump the air gap between the metals to be welded before they are brought into physical contact. It has been found that the voltage of the current should be at least 500. There is no upper limit to the voltage that can be used but insulation is the more difficult the higher the voltage. For practical purposes, however, it is preferred to have the transformer 1 step up the voltage to 1000 or more volts. Since the condenser can only be charged with direct current, after the voltage has been stepped up, the current is then rectified by passing the same through the vacuum tube 2 which is the well known radio rectifying valve. The rectified current then passes through a variable resistance 3 and charges the condenser 4. Preferably, although not necessarily, the current in the 110 volt circuit is turned off as soon as the condenser is fully charged, that is, reaches the voltage to which the transformer 1 steps up the 110 volt current. This can be accomplished by an ordinary hand operated switch in the 110 volt line. The resistance 3 is such that the amperage or the rate of current flow from the outside line to the condenser is small, such as a few amperes or even a fraction of an ampere. The important thing is that the amperage drawn on the outside 110 volt line should be sufficiently small so as to not heat up or overload the outside line. This makes the apparatus more universal in use because it can be connected with any ordinary 110 volt line or circuit. With this arrangement it is possible to obtain extremely high welding currents even from a lighting circuit with no line surges during the period of charging or welding.

The condenser 4 is charged slowly, for example, one to two seconds and then discharged instantaneously or in a fraction of a second, for example, 0.0001 of a second. The condenser 4 is connected in circuit with the chucks 5 and 6. A variable inductance 7 is placed in the line between the condenser 4 and the chuck 5. The chucks 5 and 6 are adapted to hold the metal pieces to be welded.

Figure 2:
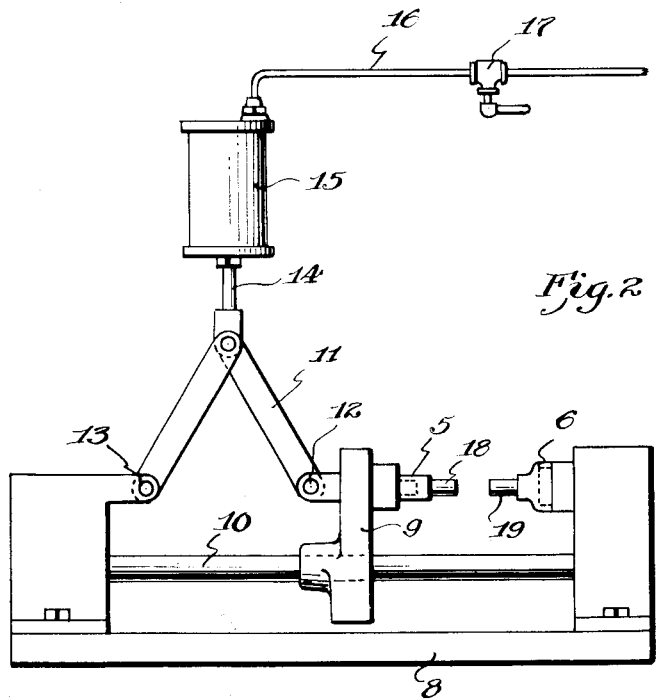
Fig. 2 is an elevation showing an apparatus suitable for practicing the instant process of electric welding.
Figures 3, 4:
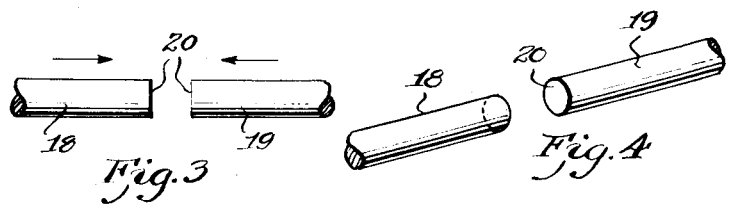
Figs. 3 and 4 are detail views of the metal rods to be welded.

There is shown in Fig. 2 an apparatus suitable for practicing the instant process of electric welding. The apparatus comprises a frame 8 to which is fixed one work holding chuck 6. The other chuck 5 is fixed to a sliding support 9 which is slidably mounted on the fixed parallel rods 10. The rods 10 are carried by the frame 8. The slide 9 is slid back and forth on the rods 10 by means of a toggle lever 11 pivotally connected as at 12 with the slide 9 and as at 13 with the support 8. The knee of the toggle is pivotally connected with the piston rod 14. The other end of the piston rod is connected to a piston within the cylinder 15. The cylinder 15 is connected with a line 16 carrying compressed air. The flow of air is controlled by the hand operated valve 17.

The operation of the apparatus is as follows: The metals to be welded can be, for example, a rod of aluminum 18 and a rod of Stellite 19 which are fixed respectively in the chucks 5 and 6. The end surfaces 20 of the rods are preferably flat so that they contact along a surface when brought together. This surface contact reduces to a minimum and practically eliminates blowing out of the molten metal during the condenser discharge and eliminates flash metal which would otherwise have to be trimmed off. The condenser is charged as above described while the metals to be welded are separated, as shown in Fig. 2, a distance insufficient to permit the current to jump the air gap between the metals 18 and 19. Live air is now admitted through line 16 into the cylinder 15 which, acting through the connecting rod 14 and toggle 11, slides the slide 9 to the right. The speed at which the slide 9 travels as it brings surfaces 20 of the metals 18 and 19 together will depend upon the frequency of the current as the condenser discharges. The important thing is that the metals 18 and 19 should be brought together while the surfaces are still molten. When the metal 18 reaches a predetermined distance from the metal 19, depending largely upon the voltage impressed upon the condenser, the current will create an arc through the air from metal 18 to metal 19. When this arc occurs, the current oscillates positive and negative, decreasing in amplitude in direct proportion to the resistance of the circuit. The lower the resistance the longer the wave train. This effect has been shown on the oscillograph. The metals 18 and 19 should be brought together with a surface to surface contact to close the gap between them preferably at the end of the first cycle of oscillation and in any event at the end of the second cycle. When the metals 18 and 19 come together the resistance drops considerably so that there is another peak of current and a lengthening of the wave train. If the time between the first cycle and the contact is very long, the metal cools off and an imperfect weld is the result. To get all the energy out of the oscillatory current flow it is necessary to have the metals come in contact after the end of one complete cycle because the spark jumps from a point on the positive electrode to a large surface on the negative electrode and then reverses itself. Therefore one cycle must be completed to make each electrode a negative surface so that the entire surfaces of both electrodes become molten. The ideal time for the contact is at the end of the second cycle so that a slightly greater depth of penetratin of heat is obtained than at the end of one cycle. Due to the rapid decay of the cyclic action any delay of contact after the second cycle is a disadvantage.

The matter of finding the correct voltage for welding is difficult. The wattage is increased by the square of the voltage, where the other constants of the circuit remain unchanged, so the higher voltages have much more current available, but the higher voltages are harder to handle because of insulation difficulties and the flash over problem. The voltage jumps across the approaching electrodes in the fixture, this distance of jumping is determined by the voltage impressed on the condenser, so that the fixture must travel much faster with high applied voltages than with low voltages (frequencies remaining constant). This resolves into the determination of the voltage necessary to cover a given area, then calculating the speed of the fixture and the frequency of the discharge to utilize the most of the power available.

From the above it will be found that the following is necessary to produce welds:

1. The correct timing of the welding fixture with the frequency used.

2. The proper adjustment of voltage and current.

3. Bringing the metals together with a pressure sufficient to weld or forge them together but somewhat or just less than sufficient to upset either of the metals being welded.

After the metals 18 and 19 have been welded they can be removed from the chucks 5 and 6. The slide 9 at this time is retracted to separate the chucks 5 and 6 and again bring them to starting position. The slide 9 can be retracted by letting live air into the cylinder 15 beneath the piston or by means of a spring within the cylinder which is compressed during the power stroke of the piston and retracts the piston when the cylinder is open to exhaust.

By way of example the above-described method and apparatus was used in welding end to end copper rods to nickel rods. The rods had a diameter of 0.080 inch. The voltage used was 1700. The capacity of the condenser was 100 microfarads and the frequency of the current passing through the metals upon discharging the condenser was 9500 cycles per second. The condenser discharged when the copper rod was 0.0135 inch from the nickel rod and a current of 20,000 amperes approximately flowed through the circuit. The condenser was charged in about one second and discharged in about 0.0001 of a second. The metals 18 and 19, which in this instance were copper and nickel rods, were welded throughout the entire areas of surfaces 20. The depth of molecular disturbance due to heat was approximately 0.00025 inch so the granular or crystalline structure of the metals were not changed and the heat required was less than where the metals were heated to a greater depth as taught in the art and as previously practiced. No heat treatment of the welded joint was necessary because the change, if any, in the crystalline structure of the metals was inappreciable. The surface was molten only for approximately 0.001 second (one millisecond) and the intense heat was for only one cycle of the discharge. This was from 0.0004 to 0.0001 second long (0.4 to 0.1 millisecond) depending on the frequency used. So, due to the thermal lag of metals it is possible to make welds between any two metals regardless of the melting points or hardnesses of either. The rapid oxidization of any metal such as aluminum cannot take place during such a weld because air is absent immediately after the spark takes place and the metals are welded before the air rushes in.

The frequency of the electrostatic current flowing between the metal bodies 18 and 19 depends upon the capacity of the condenser and the inductance. Currents having frequencies as low as 1000 cycles per second have been used. Higher frequencies are preferable because the higher the frequency the lesser the depth of penetration of the heat and the less the molecular disturbance. Excellent welds were obtained at frequencies of about 4500 cycles per second and other good welds were obtained at frequencies as high as 19,000 cycles per second. It is advisable, of course, to limit the depth of molecular disturbance as much as possible so that the granular or crystalline structure of the metals in the area of the welds is not changed sufficiently to require heat treatment to remove brittleness after the weld. It is, of course, essential that the metals to be welded be brought together in timed relation with the frequency of the electrostatic discharge and, as above stated, the contact between the surfaces should be made after the end of the first cycle and preferably approximately at the end of the second cycle.

As herein used "high frequency current" refers to current having a frequency of about 1000 cycles per second or more.

The best results were obtained with frequencies falling between 1000 and 10,000 cycles per second and particularly at about 4500 cycles per second. However, it is believed this was entirely due to the fact that the fixture used to bring the metals together did not operate fast enough, at frequencies above 10,000, to bring the metals together before the wave train decayed. With a fixture operating faster so that the metal bodies to be welded can be brought together at the end of the first or second cycle, current of considerably higher frequencies can be used.

I claim:

1. The process of welding metal bodies which consists in effecting an electrical discharge of decreasing amplitude and of sufficient voltage to set up arcing conditions between the surfaces to be welded before the bodies are initially brought together and of sufficient heat producing power to render substantially the surfaces only molten, a substantial amount of the energy of said discharge being utilized to heat the surfaces of the metal bodies before the bodies are initially brought together, and then effecting a percussive engagement of the surfaces to be welded while the surfaces are still molten and before a substantial amount of the heat produced is conducted away from the said surfaces.

2. The process of welding metal bodies which consists in effecting an electrical discharge of high frequency and decreasing amplitude and of sufficient voltage to create an arc between the surfaces to be welded before the bodies are brought together and of sufficient heat producing power to render substantially the surfaces only molten, a substantial amount of the energy of said discharge being utilized to heat the surfaces of the metal bodies before the bodies are initially brought together, and then while the surfaces are still molten and before a substantial amount of the heat produced is conducted away from the said surfaces effecting a percussive engagement of the surfaces to be welded of sufficient force to forge or weld the bodies together but insufficient to upset the same.

3. The process of welding metal bodies which consists in effecting an electrical discharge of high frequency and decreasing amplitude and of sufficient voltage to create an arc between them at the surfaces to be welded while spaced one from the other and of sufficiently high amperage to render substantially the surfaces only molten, a substantial amount of the energy of said discharge being utilized to heat the surfaces of the metal bodies before the bodies are initially brought together, and after one cycle and approximately within two cycles effecting a percussive engagement of the surfaces to be welded.

4. The process of welding metal bodies having flat surfaces which consists in effecting an electrical discharge of high frequency and decreasing amplitude and of sufficient voltage to set up arcing conditions between the flat surfaces to be welded before the bodies are initially brought together and of sufficient heat producing power to render substantially the flat surfaces only molten, a substantial amount of the energy of said discharge being utilized to heat the surfaces of the metal bodies before the bodies are initially brought together, and then while the flat surfaces are still molten and before a substantial amount of the heat produced is conducted away from the said surfaces effecting a percussive engagement of the surfaces sufficient to weld or forge the surfaces together but insufficient to upset the metal bodies.

5. The process of welding metal bodies having flat surfaces which consists in effecting an electrical discharge of high frequency and decreasing amplitude initially of at least 1000 volts potential between the flat surfaces to be welded before the surfaces are initially brought together of sufficient heat producing power to render substantially the surfaces only molten, a substantial amount of the energy of said discharge being utilized to heat the surfaces of the metal bodies before the bodies are initially brought together, and then effecting a percussive engagement of the surfaces while molten and before a substantial amount of the heat produced is conducted away from the said surfaces sufficient to weld or forge the same together but insufficient to upset the metal bodies.

6. The process of welding metal bodies which consists in effecting an electrical discharge of decreasing amplitude and of sufficient voltage to set up arcing conditions between them at the surfaces to be welded while the surfaces are spaced one from the other to render substantially the surfaces only molten, a substantial amount of the energy of said discharge being utilized to heat the surfaces of the metal bodies before the bodies are initially brought together, the said discharge having a voltage sufficiently high to jump the gap between the surfaces before they are initially brought together, and thereafter while the surfaces are still molten and before a substantial amount of the heat produced is conducted away from the said surfaces effecting an electropercussive engagement of the surfaces sufficient to weld or forge the surfaces together.

7. The process of welding metal bodies which consists in effecting an electrical discharge of decreasing amplitude having a frequency of not less than 1000 cycles per second between them at the surfaces to be welded while the surfaces are spaced one from the other and of sufficiently high amperage to render substantially the surfaces only molten, a substantial amount of the energy of said discharge being utilized to heat the surfaces of the metal bodies before the bodies are initially brought together, the said discharge having a voltage sufficiently high to jump the gap between the surfaces before they are initially brought together, and thereafter while the surfaces are still molten and before a substantial amount of the heat produced is conducted away from the said surfaces effecting an electro-percussive engagement of the surfaces sufficient to weld or forge the surfaces together.

8. The process of welding metal bodies which consists in effecting an electrical discharge of high frequency and decreasing amplitude of at least 1000 volts potential between them while spaced one from the other and before initial contact of the bodies and of sufficient amperage to render substantially the adjacent surfaces only molten, a substantial amount of the energy of said discharge being utilized to heat the surfaces of the metal bodies before the bodies are initially brought together, and after one cycle and before the wave train decays effecting a percussive engagement of the surfaces to be welded.

ALFRED VANG.